Oct. 22, 1968   F. R. RACKI   3,407,009
FLUID PRESSURE BRAKE CONTROL VALVE DEVICE
Filed Feb. 24, 1967   2 Sheets-Sheet 2
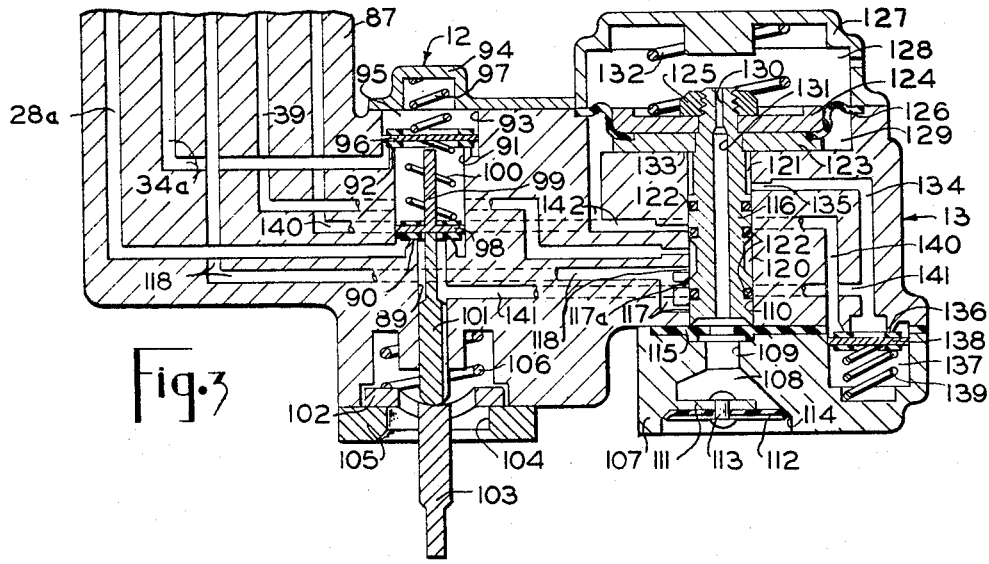
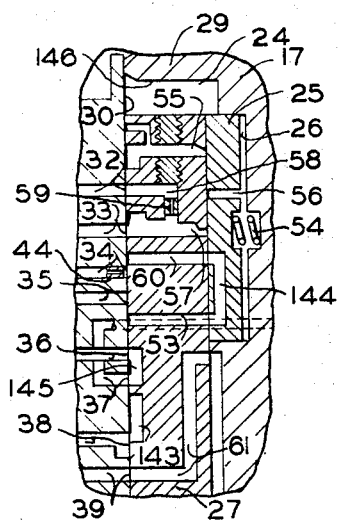
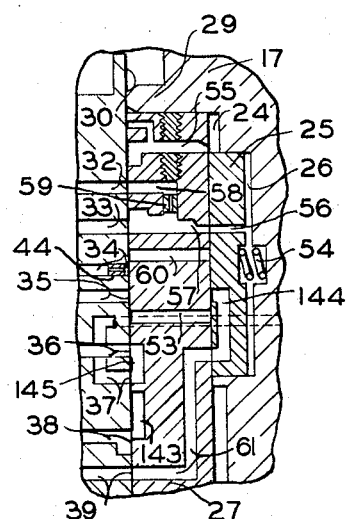
INVENTOR.
FRANCIS R. RACKI
BY *A. A. Steinmiller*
ATTORNEY

United States Patent Office 3,407,009
Patented Oct. 22, 1968

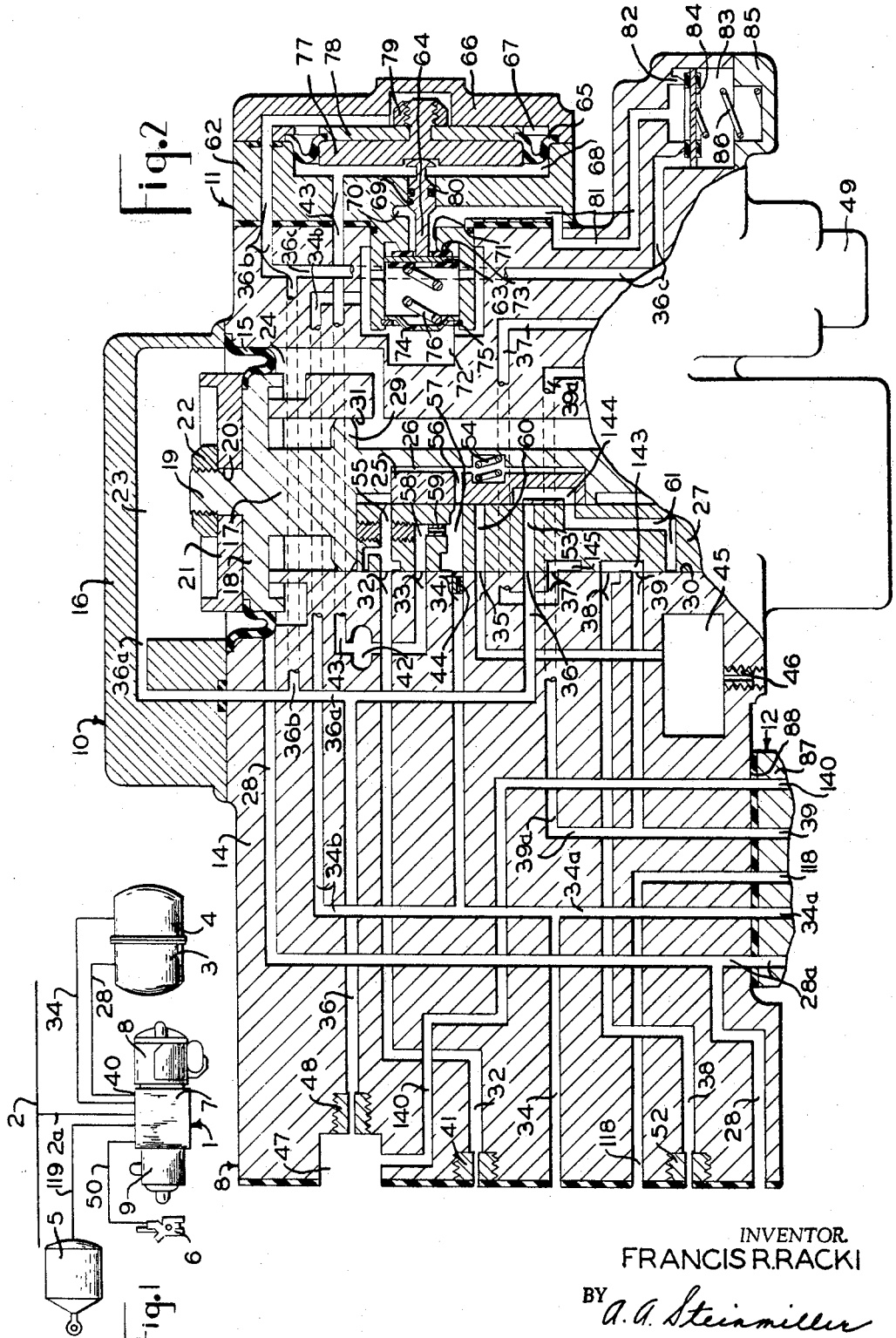

3,407,009
**FLUID PRESSURE BRAKE CONTROL
VALVE DEVICE**
Francis R. Racki, Pittsburgh, Pa., assignor to Westinghouse Air Brake Company, Wilmerding, Pa., a corporation of Pennsylvania
Filed Feb. 24, 1967, Ser. No. 618,382
10 Claims. (Cl. 303—35)

ABSTRACT OF THE DISCLOSURE

This invention covers a brake control valve device the service portion of which includes an accelerated service release valve device operable by an abutment constantly subject on one side to brake pipe pressure and on the opposite side to brake pipe pressure supplied thereto via a choke carried by the service slide valve in the release, service and service lap positions of the service slide valve. Upon effecting a brake release subsequent to a brake application, the pressure in the brake pipe is increased at a rate exceeding the capacity of the choke, the accelerated service release valve device will be operated to establish a communication between the emergency reservoir and brake pipe to cause equalization of pressure therebetween thereby hastening the recharge of the brake pipe. The accelerated service release valve device is operated according to the rate of recharge of the brake pipe and is not dependent upon brake pipe pressure reaching a value in excess of auxiliary reservoir pressure. The service portion of the brake control valve device constituting the present invention further includes a novel reservoir release valve device that embodies therein one-way check valve means enabling flow from the auxiliary reservoir to the emergency reservoir whereby equalization of both the auxiliary and emergency reservoirs into the brake pipe occurs upon operation of the accelerated service release valve device, thereby providing that the pressure in these reservoirs is reduced sufficiently to insure that the brakes on a freight car equipped with this brake control valve device are always released when the car is coupled to a freight train subsequent to being set off from a passenger train.

---

This invention relates to a brake control valve device for railway cars and, more particularly, to a brake control valve device having a new and improved accelerated service release valve device operative upon initiating a brake release following a brake application to cause a dump back of fluid under pressure from the auxiliary and emergency reservoirs to the brake pipe thereby resulting in a rapid build-up of pressure in the brake pipe to the normal charged value, responsive to which the brakes are completely released.

In Patent 3,232,678 issued Feb. 1, 1966 to William G. Wilson and assigned to the assignee of the present application, there is shown and described a railway car brake control valve device, having in addition to the conventional service portion and emergency portion, an accelerated service release valve device, a two-position diaphragm-type brake cylinder release valve device, a manually operative reservoir release valve device for controlling operation of the diaphragm-type brake cylinder release valve device as well as the venting of the auxiliary and emergency reservoirs to atmosphere, and an automatically operative piston valve means. This piston valve means is automatically operable in response to recharging the usual brake pipe to a chosen pressure, for example, forty-four pounds per square inch, subsequent to effecting a complete release of fluid under pressure from a brake cylinder device to atmosphere, by operation of the brake cylinder release valve device following an emergency application of the brakes, for establishing a communication between the auxiliary reservoir, initially charged to, for example, one hundred and ten pounds per square inch, and the brake pipe to cause substantial equalization of pressure therebetween. This operation enables a railway freight car provided with this control valve device to operate satisfactorily in a freight train subsequent to this freight car being set off from a passenger train. This substantial equalization of pressure between the auxiliary reservoir and the brake pipe further assures operation of the accelerated service release valve device in response to an increase in brake pipe pressure after the occurence of this equalization.

It is the general purpose of this invention to provide a novel accelerated service release valve device for a railway car brake control valve device which release valve device operates independently of the pressure in the auxiliary reservoir subsequent to a brake application. Furthermore, this accelerated service release valve device operates substantially instantaneously, upon instigating an increase in brake pipe pressure, subsequent to a brake application, at a rate exceeding a certain low rate, to cause a flow of fluid under pressure from either the emergency reservoir or from the emergency reservoir and also the auxiliary reservoir if the pressure in the latter exceeds that in the former, to the brake pipe until a substantial equalization of pressure occurs.

More specifically, this invention comprises a brake control valve device the service portion of which includes an accelerated service release valve device operable by an abutment constantly subject on one side to brake pipe pressure and on the opposite side to brake pipe pressure supplied thereto via a choke carried by the service slide valve in the release, service and service lap positions of the service slide valve. Consequently, whenever, upon effecting a brake release subsequent to a brake application, the pressure in the brake pipe is increased at a rate exceeding the capacity of the choke, the accelerated service release valve device will be operated to establish a communication between the emergency reservoir and brake pipe to cause equalization of pressure therebetween thereby hastening the recharge of the brake pipe. Accordingly, the accelerated service release valve device is operated according to the rate of recharge of the brake pipe and is not dependent upon brake pipe pressure reaching a value in excess of auxiliary reservoir pressure as is necessary for operation of the accelerated service release valve device disclosed in the abovementioned Wilson patent.

The service portion of the brake control valve device constituting the present invention further includes a novel reservoir release valve device that embodies therein one-way check valve means enabling flow from the auxiliary reservoir to the emergency reservoir whereby equalization of both the auxiliary and emergency reservoirs into the brake pipe occurs upon operation of the accelerated service release valve device, thereby providing that the pressure in these reservoirs is reduced sufficiently to insure that the brakes on a freight car equipped with this brake control valve device are always released when the car is coupled to a freight train subsequent to being set off from a passenger train.

In the accompanying drawings:

FIG. 1 is a diagrammatic view, in outline, showing a railway freight car brake equipment embodying a novel brake control valve device embodying the invention.

FIG. 2 is a diagrammatic view, mainly in section, of the service portion of the novel brake control valve device shown in FIG. 1 showing a service slide valve and a graduating valve of this brake control valve device in their release position.

FIG. 3 is a diagrammatic view of a manually operative reservoir release valve device and a fluid pressure operative brake cylinder release valve device embodied in a single casing which is secured by any suitable means to the service portion of the brake control valve device shown in FIG. 2.

FIG. 4 is a partial diagrammatic view of the service portion shown in FIG. 2 showing the service slide valve and the graduating valve in their service position.

FIG. 5 is a partial diagrammatic view of the service portion shown in FIG. 2 showing the service slide valve and the graduating valve in their service lap position.

Referring to FIG. 1 of the drawings, the railway freight car brake equipment embodying the invention comprises a brake control valve device 1 to the pipe bracket of which is connected the usual brake pipe 2, an auxiliary reservoir 3, an emergency reservoir 4, a brake cylinder device 5, and a retaining valve device 6.

The brake control valve device 1 comprises a pipe bracket 7 to the opposite faces of which is secured in sealed relation therewith, a novel service portion 8 and an emergency valve portion 9, respectively.

The emergency valve portion 9 may be substantially the same in construction and operation as the corresponding emergency valve portion 8 of the car brake control valve device 1 shown in the hereinbefore-mentioned Patent 3,232,678. Accordingly, a detailed description of this emergency valve portion is believed to be unnecessary.

The novel service valve portion 8 (FIG. 2) comprises a service valve device 10, an accelerated service release valve device 11, a manually operatively reservoir release valve device 12 (FIG. 3) and a brake cylinder release valve device 13.

The service valve device 10 comprises a body or casing section 14 which is secured to the right-hand side of the pipe bracket 7 (FIG. 1) by any suitable means (not shown), and a diaphragm 15 (FIG. 2) that has its outer periphery clamped between the upper end of the casing section 14 and a cover member 16 secured to the casing section 14 by any suitable means (not shown).

The inner periphery of the diaphragm 15 is operatively connected to one end of a valve operating or service piston stem 17 having at its upper end a diaphragm follower 18 and a screw-threaded stem 19 that extends through a bore 20 formed in a diaphragm follower plate 21 for receiving in screw-threaded engagement therewith a nut 22 which serves to clamp the inner periphery of the diaphragm 15 between the follower 18 and follower plate 21.

The diaphragm 15 cooperates with the casing section 14 and cover member 16 to form within the service valve device 10 and on the respective opposite sides of the diaphragm two chambers 23 and 24. The chamber 24 contains the stem 17 which is adapted to operate a graduating valve 25 that is disposed in a recess 26 formed in the stem 17 and a service slide valve 27 also contained in the chamber 24 which chamber is connected to the auxiliary reservoir 3 (FIG. 1) via a passageway 28 (FIG. 2) extending through the casing section 14 and pipe bracket 7 and a pipe bearing the same numeral.

The valve operating stem 17 is provided adjacent the diaphragm follower 18 with a guide member 29 which is slidably mounted between a service slide valve seat 30 and a wall surface 31 formed on the casing section 14. The purpose of the guide member 29 is to give a stabilizing effect to the diaphragm 15 and prevent the service slide valve 27 from being raised from its seat 30 by fluid under pressure in the ports opening at the surface of this seat upon which the slide valve 27 is slidably mounted.

As shown in FIG. 2 of the drawings, there are eight passageways opening through respective corresponding ports at the face of the slide valve seat 30, the passageways and ports being respectively designated by the numerals 32, 33, 34, 35, 36, 37, 38 and 39.

The port 32 is connected by its corresponding numbered passageway in the slide valve seat 30, the casing section 14 of the service valve device 10, and the pipe bracket 7 (FIG. 1) to a chamber (not shown) in the pipe bracket. A passageway (not shown formed in the pipe bracket 7 has one end opening into this chamber in this pipe bracket and the other end opening at a face 40 (FIG. 1) on the top of the pipe bracket 7 to which is connected a branch pipe 2a of the brake pipe 2.

An auxiliary reservoir charging choke 41 (FIG. 2) is disposed in the passageway 32 adjacent the pipe bracket 7 to control the rate of charging the chamber 24 to which the auxiliary reservoir 3 is connected via the passageway and corresponding pipe 28 in order that the faster rate of charging of the chamber 23 in a manner hereinafter explained in detail will maintain the diaphragm 15, stem 17, graduating valve 25 and service slide valve 27 in their release position shown in FIG. 2.

The port 33 is connected by its correspondingly numbered passageway in the slide valve seat 30 to a volume chamber 42 formed in casing section 14 of the service valve device 10. This volume chamber 42 is connected to the hereinbefore-mentioned accelerated service release valve device 11, which is secured to the casing section 14 as hereinafter explained, by a passageway 43 extending through the casing section 14.

The port 34 has disposed therein an emergency reservoir charging choke 44 and is connected by its correspondingly numbered passageway in the casing section 14 of the service valve device 10 and the pipe bracket 7 (FIG. 1) to a port opening at the face 40 on the top of the pipe bracket 7 to which is connected one end of a correspondingly numbered pipe that has its opposite end connected to the emergency reservoir 4.

A first branch passageway 34a in the casing section 14 connects the passageway 34 to the hereinbefore-mentioned novel reservoir release valve device 12 (FIG. 3) which is hereinafter described in detail.

A second branch passageway 34b (FIG. 2) in the casing section 14 connects that portion of the passageway 34 therein to the accelerated service release valve device 11.

The port 35 is connected by its correspondingly numbered passageway in the slide valve seat 30, and the casing section 14 to a quick service volume chamber 45 in the casing section 14, which volume chamber is constantly open to atmosphere via a choke 46.

The port 36 is connected by its correspondingly numbered passageway in the slide valve seat 30 and the casing section 14 to a chamber 47 formed in this casing section. This chamber 47 in the casing section 14 is open to the hereinbefore-mentioned chamber in the pipe bracket 7 which is connected to the brake pipe 2 as hereinbefore described.

A first branch passageway 36a extending through the casing section 14 and the cover member 16 connects that portion of the passageway 36 in the casing section 14 to the chamber 23 above the diaphragm 15.

A second branch passageway 36b extending through the casing section 14 connects that portion of the first branch passageway 36a therein to the accelerated service release valve device 11.

A choke 48, the size of which is greater than that of the choke 41, is disposed in that end of passageway 36 that opens into the chamber 47 in the casing section 14. This choke 48, when the accelerated service release valve device 11 operates in a manner hereinafter described in detail to cause flow from the emergency reservoir 4 to the brake pipe 2, acts to restrict this flow to the brake pipe 2 and thereby effects a quick build-up of pressure in the chamber 23 above the diaphragm 15. This increase in pressure above the diaphragm 15, due to the restriction offered by the choke 48, aids in quickly establishing a sufficient differential of pressure on the diaphragm 15 to deflect this diaphragm downward to shift, through the intermediary of the stem 17, the graduating valve 25 and the service slide valve 27 from a service lap position to a release position in a manner hereinafter explained in detail.

The port 37 is connected by its correspondingly numbered passageway in the slide valve seat 30, and the casing section 14 to a conventional quick service limiting valve device 49 which forms no part of the present invention.

The port 38 is connected by its correspondingly numbered passageway in the slide valve seat 30, the casing section 14, and the pipe bracket 7 to a port opening at the face 40 on the pipe bracket 7 into which port is received one end of a pipe 50 (FIG. 1) connected at its opposite end to the hereinbefore-mentioned pressure retaining valve device 6 which may be of the usual well-known construction, having a cut-out position in which fluid under pressure is adapted to be completely vented from the brake cylinder device 5 and also having a cut-in position in which it operates in the usual manner in releasing the brakes to retain a predetermined pressure in the brake cylinder device 5. A brake cylinder exhaust choke 52 (FIG. 2) is disposed in the passageway 38 adjacent the pipe bracket 7 to control the rate at which fluid under pressure is vented from the brake cylinder device 5 when a release of the brakes is effected.

The port 39 is connected by its correspondingly numbered passageway in the slide valve seat 30 and the casing section 14 to the brake cylinder release valve device 13 (FIG. 3).

A branch passageway 39a extending through the casing section 14 connects that portion of the passageway 39 in the casing section 14 to the hereinbefore-mentioned quick service limiting valve device 49.

Fluid under pressure supplied from the brake pipe 2 (FIG. 1) to the emergency valve portion 9 of the brake control valve device 1 causes an emergency piston (not shown), an emergency slide valve (not shown), and an emergency graduating valve (not shown) to be moved to their normal brake release position in the manner described in the hereinbefore-mentioned Patent 3,232,678.

It will here be noted that with the service slide valve device 10 in its normal release position, as shown in FIG. 2, fluid under pressure flows from the brake pipe 2 to the chamber 47 (FIG. 2) in the casing section 14 via the branch pipe 2a, and the hereinbefore-mentioned passageway and chamber in the pipe bracket 7. As can be seen from FIG. 2, fluid under pressure flows from the chamber 47 by way of the choke 48, the passageway 36 extending through the casing section 14 to the corresponding port in the slide valve seat 30 and thence through a first passageway 53 extending horizontally through the service slide valve 27, the right-hand end of which passageway is blanked off or lapped by the graduating valve 25 which is biased against the right-hand face of the service slide valve 27 by a spring 54 interposed between the valve operating stem 17 and the right-hand side of the graduating valve 25.

Also, fluid under pressure flows from the chamber 47 via the passageway 36 and the first branch passageway 36a to the chamber 23 above the diaphragm 15 to charge this chamber to the pressure carried in the brake pipe 2. Furthermore, while the service slide valve 27 and the graduating valve 25 occupy their normal release position, as shown in FIG. 2, fluid under pressure present in the hereinbefore-mentioned chamber in the pipe bracket 7 flows therefrom through the passageway in the pipe bracket 7, the auxiliary reservoir charging choke 41, passageway 32 and a second passageway 55 extending horizontally through the service slide valve 27 to the chamber 24 at a rate controlled by the size of the choke 41. Fluid under pressure thus supplied to the chamber 24 flows therefrom through the passageway and corresponding pipe 28 to the auxiliary reservoir 3. From the chamber 24 fluid under pressure also flows to the emergency reservoir 4 via a passageway 56 extending through the graduating valve 25, a third passageway 57 extending through the service slide valve 27 and in alignment with the passageway 56 while the graduating valve 25 and the service slide valve 27 occupy their release position, as shown in FIG. 2, the emergency reservoir charging chokes 44 and passageway and corresponding pipe 34, so that both the auxiliary reservoir 3 and the emergency reservoir 4 are charged with fluid up to brake pipe pressure. The choke 44 retards the rate of flow to the emergency reservoir 4, so that more fluid will flow toward the back end of the train than would be the case if the flow of fluid to this reservoir were at a fast rate.

The service slide valve 27 is provided with a fourth passageway 58 one end of which opens at the left-hand face of the slide valve 27 and the other end of which opens into the third passageway 57 in the valve 27 intermediate the ends of this passageway 57. A choke 59 is disposed in this fourth passageway 58 intermediate the ends thereof. Therefore, while the service slide valve 27 and the graduating valve 25 occupy their normal release position in which they are shown in FIG. 2, fluid under pressure flows from the chamber 24 to the accelerated service release valve device 11 via passageway 56 in the graduating valve 25, passageways 57 and 58 in service slide valve 27, choke 59 in passageway 58, port and corresponding passageway 33, volume chamber 42 and passageway 43.

The service slide valve 27 is further provided with a fifth passageway 60 extending horizontally through the service slide valve 27, the right-hand end of which passageway is blanked off or lapped by the graduating valve 25 while it occupies the position shown in FIG. 2. While the service slide valve 27 occupies its release position shown in FIG. 2, the left-hand end of the passageway 60 therein is in alignment with the port 35 in the service slide valve seat 30.

The service slide valve 27 has formed therein a sixth passageway 61 one end of which, as can be seen from FIGS. 2, 3 and 4, opens at the surface of the right-hand face of the slide valve 27 at a location substantially above the location at which the other end of this passageway opens at the surface of the left-hand face of this slide valve.

As shown in FIG. 2 of the drawings, the accelerated service release valve device 11 comprises a casing section 62 which is secured to the casing section 14 of the service valve device 10 by any suitable means (not shown). This valve device 11 further comprises a flat disc-type valve 63 and a valve operating stem 64 which valve 63 is operable by fluid under pressure exerted on the right-hand side of a diaphragm 65 operably connected to the stem 64 and suitably clamped about its outer periphery to the casing section 62 by a clamping cover 66 attached to the casing section 62 by any suitable means.

Two chambers 67 and 68 are formed respectively at the opposite sides of the diaphragm 65. Chamber 68 is connected by a bore 69 to a first chamber 70 which in turn is connected by a coaxial bore 71 to a second chamber 72. Contained in the chamber 72 is the valve 63 which cooperates with an annular valve seat 73 formed on the casing section 62 and surrounding the left-hand end of the bore 71 therein and projecting into the chamber 72. Interposed between the left-hand face of the valve 63 and a spring seat 74 disposed in the chamber 72 against a snap ring 75 carried by the casing section 62 is a spring 76 for resiliently seating the valve 63 on the valve seat 73 to normally close communication between chamber 72 and the bore 71.

The valve operating stem 64 comprises two portions of unequal diameter the larger of which is slidably mounted in the bore 69. The right-hand end of the valve stem 64 extends into the chamber 68 and abuts the center of a diaphragm follower 77 between which and a diaphragm follower plate 78 secured thereto by a nut 79 is clamped the inner periphery of the hereinbefore-mentioned diaphragm 65.

That portion of the stem 64 having the larger diameter is provided intermediate its ends with an O-ring 80 disposed in a corresponding annular recess formed in the stem 64; said O-ring 80 having sealing and sliding contact with the wall of the bore 69 to minimize leakage of fluid under pressure from chamber 68 to the chamber 70 into which opens one end of a passageway 81 extending through the casing sections 62 and 14, the opposite end of which opens within an annular valve seat 82 to a chamber 83. Contained in chamber 83 is a flat disc-type valve 84 which cooperates with the annular valve seat 82. Interposed between the disc-type valve 84 and a cover member 85 secured to the casing section 14 by any suitable means (not shown) and closing the open end of the chamber 83 is a spring 86 for resiliently seating valve 84 on the seat 82 to normally close communication between the chamber 83 and the passageway 81.

The hereinbefore-mentioned second branch passageway 36b formed in the casing section 14 extends through the casing section 62 and clamping cover 66 to the chamber 67 at the right-hand side of the diaphragm 65. A third branch passageway 36c in the casing section 14 connects the second branch passageway 36b to the chamber 83.

One end of the hereinbefore-mentioned second branch passageway 34b in the casing section 14 opens into the passageway 34 intermediate the ends thereof and the other end of this second branch passageway 34b opens into the chamber 72. Since the passageway 34 is connected by the correspondingly numbered pipe (FIG. 1) to the emergency reservoir 4, fluid under pressure at emergency reservoir pressure is always present in the chamber 72.

The manually operative reservoir release valve device 12 (FIG. 3) and the brake cylinder release valve device 13 (FIG. 3) are embodied in a casing 87 which is secured to a bolting face 88 (FIG. 2) formed on the lower end of the casing section 14 by any suitable means (not shown). The casing section 87 (FIG. 3) is provided with a bore 89 at the upper end of which is formed an annular valve seat 90, and a first coaxial counterbore 91 at the upper end of which is formed a second annular valve seat 92. A second counterbore 93 coaxial with the first counterbore 91 and of a larger diameter is also provided in the casing section 87 the upper end of this counterbore 93 being closed by a cover member 94 secured to the casing section 87 by any suitable means (not shown) so that this counterbore 93 constitutes a chamber 95 into which opens one end of the hereinbefore-mentioned first branch passageway 34a (FIG. 2) that extends through the casing 87 and casing section 14 and at its other end opens into the passageway 34 intermediate the ends thereof.

Disposed in the chamber 95 (FIG. 3) is a flat disc-type valve 96 which is normally biased against the annular valve seat 92 by a spring 97 interposed between the valve 96 and the cover member 94.

Disposed in the counterbore 91 is a second flat disc-type valve 98 which has formed integral therewith and extending from the upper side thereof a stem 99 the length of which is such that while the valve 98 is seated on the seat 90 the upper end of the stem 99 is disposed slightly below the lower side of the valve 96 while this valve is seated on its valve seat 92.

Therefore, the valve 98 can be moved upward a chosen distance in a manner hereinafter explained against the yielding resistance of a spring 100 which is a lighter spring than the spring 97 and is disposed in surrounding relation to the stem 99 and interposed between the upper side of the valve 98 and the lower side of the valve 96 without effecting unseating of the valve 96. When the valve 98 is so unseated, fluid under pressure is released from the auxiliary reservoir 93 to atmosphere via the pipe and corresponding passageway 28, a branch passageway 28a extending through the casing section 14 and casing 87 one end of which opens into the passageway 28 intermediate the ends thereof and the other end of which opens into the counterbore 91 at the lower end thereof, the counterbore 91 and the bore 89.

Slidably mounted in the bore 89 is a fluted stem 101 the upper end of which abuts the lower side of the valve 98. The lower end of the fluted stem 101 abuts the upper side of a flange 102 that is integral with the upper end of a manually operated release valve stem 103 that extends through a bore 104 in a first bottom cover 105 secured to the casing 87 by any suitable means (not shown).

Disposed in surrounding relation to the stem 101 and interposed between the upper side of the flange 102 and the casing 87 is a spring 106 that is effective to normally bias the flange 102 against the bottom cover 105 to thereby allow the spring 97 to effect seating of the valve 96 on its seat 92, and the spring 100, which is a lighter spring than the spring 97, as hereinbefore stated, to effect seating of the valve 98 on its seat 90 respectively.

The casing 87 of the hereinbefore-mentioned brake cylinder release valve device 13 has secured thereto in spaced-apart relation to the first bottom cover 105 a second bottom cover 107 in which is provided a chamber 108 into which opens one end of a bore 109 the opposite end of which opens into one end of a bore 110 extending vertically through the casing 87. The bottom cover 107 has formed integral therewith a horizontally disposed arm 111 to which a dished circular rubber shield 112 is secured by a centrally disposed rivet 113 that extends through coaxial bores in the shield 112 and arm 111. The circumferential surface of the shield 112 is adapted to contact a substantially conical inner surface 114 formed on the bottom of the second bottom cover 107 for preventing access to the chamber 108 of particles of foreign matter or by nest-building insects such as, for example, mud wasps. A plurality of notches or grooves are formed in the outer edge of the shield 112 for preventing sealing contact thereof with the inner surface 114. It will be noted that the surface 114 formed on the second bottom cover 107 extends somewhat beyond the rubber shield 112 so as to provide an adequate protection against the formation of ice over the opening in the lower side of the cover 107, and that the shield 112 has sufficient area and flexibility to insure its displacement under the pressure of fluid in the chamber 108 to eject any foreign matter that might reach this chamber.

Disposed at the lower end of the bore 110 and between casing 87 and the second bottom cover 107 is a resilient annular valve seat member 115 which may be constructed of, for example, rubber or some other suitable material. Slidably mounted in the bore 110 above the valve seat member 115 is a spool-type brake cylinder release valve 116 the lower end of which is dished to provide a short sleeve-like portion which, while the release valve 116 occupies the position shown in FIG. 3 of the drawings, forms a seal with the valve seat member 115 to prevent flow of fluid under pressure from a first passageway 117 formed in the casing 87, and opening at one end at the wall surface of the bore 110 slightly above the lower end thereof, to the chamber 108.

The other end of the passageway 117 opens into a second passageway 118 in the casing 87 intermediate the ends of this passageway 118 which at one end opens at the wall surface of the bore 110 at a location somewhat above the location at which a branch 117a of the passageway 117 opens at the wall surface of this bore, it being noted from FIG. 3 that the branch 117a opens at the wall surface of the bore 110 slightly above the location at which the above-mentioned one end of the passageway 117 opens at this wall surface. The passageway 118 extends through the casing 87, the casing section 14, the pipe bracket 7, and the emergency valve portion 9 in the manner explained in hereinbefore-mentioned Patent 3,232,678 and is connected by a pipe 119 (FIG. 1) to the brake cylinder device 5 as explained in this patent.

Referring again to FIG. 3 of the drawings, it will be noted that the spool-type brake cylinder release valve 116 is provided with two spaced-apart elongated peripheral annular grooves 120 and 121 and with three peripheral annular grooves, two between the elongated peripheral annular grooves 120 and 121 and one adjacent and just below the lower end of the elongated peripheral annular groove 120, in each of which is disposed an O-ring 122 which forms a seal with the wall surface of the bore 110 to prevent leakage of fluid under pressure from either of the elongated peripheral annular grooves 120 and 121 to the other and also from the lower end of the groove 120 along the length of the spool-type release valve 116 to the chamber 108.

The upper end of the release valve 116 is provided with two portions of reduced diameter to form two spaced-apart shoulders against which rest respectively two diaphragm followers 123 and 124 which are forced toward each other by a nut 125 having screw-threaded engagement with screw threads formed on the upper end of the release valve 116 to clamp between these diaphragm followers the inner periphery of a diaphragm 126. The outer periphery of the diaphragm 126 is clamped between the casing 87 and a substantially cup-shaped cover member 127, that is secured to the casing 87 by any suitable means (not shown).

The diaphragm 126 cooperates with the casing 87 and the cover member 127 to form within the brake cylinder release valve device 13 and on the respective opposite sides of the diaphragm 126, two chambers 128 and 129. The chamber 128 is open to atmosphere via a bore 130 and coaxial counterbore 131 extending longitudinally through the release valve 116, the bore 109, the chamber 108, and past the shield 112 which is deflected away from the conical surface 114 whenever the pressure in the chamber 108 exceeds atmospheric pressure to provide for flow of fluid under pressure from the chamber 108 to atmosphere.

Disposed in the chamber 128 and interposed between the diaphragm follower 124 and the cover member 127 is a spring 132 which is effective in the absence of fluid under pressure in the chamber 129 to bias the diaphragm follower 123 against a stop surface 133 formed on the casing 87.

While the brake cylinder release valve 116 occupies the position shown in FIG. 3, the elongated peripheral annular groove 120 thereon is effective to establish a communication between the hereinbefore-mentioned passageways 39 and 118 in the casing 87.

Also, while the brake cylinder release valve 116 occupies the position shown in FIG. 3, the elongated peripheral annular groove 121 thereon is effective to establish a communication between the chamber 129 below the diaphragm 126 and a third passageway 134 in the casing 87, one end of which passageway 134 opens through a restriction or choke 135 at the wall surface of the bore 110.

The other end of the passageway 134 opens within an annular valve seat 136 formed on the bottom of the casing 87 which cooperates with the bottom cover 107 to form a chamber 137. Disposed in the chamber 137 is a flat disc-type check valve 138 between which and the bottom cover 107 is interposed a spring 139 which is normally effective to bias the check valve 138 into seating contact with the valve seat 136 to close communication between the passageway 134 and chamber 137 and positively prevent back flow of fluid under pressure from the chamber 137 to the passageway 134.

Opening into the chamber 137 is one end of a fourth passageway 140 formed in the casing 87 and casing section 14. The opposite end of the passageway 140 opens into the hereinbefore-mentioned chamber 47 (FIG. 2) in the casing section 14.

Opening into the hereinbefore-mentioned passageway 134 (FIG. 3) intermediate the ends thereof is one end of a fifth passageway 141 formed in the casing 87. The opposite end of this fifth passageway 141 opens at the wall surface of the hereinbefore-mentioned bore 89 intermediate the ends thereof.

Formed in the casing 87 is a sixth passageway 142 one end of which opens at the wall surface of the bore 110 above the location at which one end of the hereinbefore-mentioned passageway 39 opens at the wall surface of this bore 110 and below the location at which the herein- before-mentioned one end of the passageway 134 opens at the wall surface of this bore via the choke 135. The opposite end of the passageway 142 opens into the hereinbefore-mentioned chamber 129 below the diaphragm 126.

OPERATION

*Initial charging*

To intially charge the brake equipment shown in FIG. 1, fluid under pressure is supplied to the brake pipe 2 in the usual well-known manner. Fluid under pressure thus supplied to the brake pipe 2, flows via branch pipe 2a and a passageway and a chamber in the brake bracket 7 to the chamber 47 (FIG. 2). Fluid under pressure thus supplied to the chamber 47 flows therefrom to the chamber 23 (FIG. 2) above the diaphragm 15 via the choke 48, the passageway 36 and branch passageway 36a. Fluid under pressure also flows from the brake pipe 2 to the chamber 24 below the diaphragm 15 via the branch pipe 2a (FIG. 1), the passageway and chamber in the pipe bracket 7, choke 41 (FIG. 2), passageway 32 in the casing section 14 and the corresponding port in the slide valve seat 30, and the passageway 55 in the service slide valve 27.

Fluid under pressure also flows from the brake pipe 2 to an emergency piston chamber (not shown) in the emergency valve portion 9 (FIG. 1) of the brake control valve device 1.

Fluid under pressure supplied from the brake pipe 2 to the chamber 24 (FIG. 2) in the manner explained above, flows from this chamber to the auxiliary reservoir 3 (FIG. 1) via the passageway and corresponding pipe 28 and to the emergency reservoir 4 via the passageway 56 (FIG. 2) in the graduating valve 25, passageway 57 in the service slide valve 27, choke 44 and the passageway and corresponding pipe 34 (FIG. 1) so that both the auxiliary reservoir 3 and the emergency reservoir 4 are charged with fluid up to brake pipe pressure.

It will be noted from FIGS. 2 and 3 that the branch passageway 28a connects the passageway 28 to the interior of the counterbore 91 in the reervoir release valve device 12, and that the branch passageway 34a connects the passageway 34 to the chamber 95 in this valve device 12. Consequently, the chamber 95 and the interior of the counterbore 91 are connected respectively to the emergency reservoir 4 and the auxiliary reservoir 3 and are charged to the same pressure as is present in these reservoirs.

While the service slide valve 27 occupies its release position shown in FIG. 2, the brake cylinder device 5 (FIG. 1) is open to atmosphere via the pipe 119, thence through the pipe bracket 7 and the emergency valve portion 9, passageway 118 (FIGS. 2 and 3), elongated peripheral annular groove 120 (FIG. 3) on the brake cylinder release valve 116, passageway and corresponding port 39, a cavity 143 (FIG. 2) formed in the left-hand face of the service slide valve 27, port and corresponding passageway 38 extending through the casing section 14 and the pipe bracket 7, choke 52 in passageway 38, the pipe 50 (FIG. 1) and the retaining valve device 6 which it may be assumed is in a non-pressure-retaining position.

It should be understood that fluid under pressure supplied from the brake pipe 2 to the branch passageway 36a flows therefrom to chamber 67 in the accelerated service release valve device 11 via the branch passageway 36b, and that the chamber 72 in this valve device 11 is connected to the emergency reservoir 4 via branch pipe 34b and passageway and corresponding pipe 34. Furthermore, the chamber 68 in this valve device 11 is connected to the service valve seat 30 (FIG. 2) via passageway 43, volume chamber 42 and passageway and corresponding port 33. Consequently, fluid under pressure supplied to the chamber 24 will flow to the volume chamber 42 via passageway 56 and 57, choke 59, passageways 58 and 33 and thence to the chamber 68 via passageway 43.

Service brake application

Let it be supposed that it is desired to effect a service application of the brakes. A service application of the brakes is initiated by effecting a gradual reduction in brake pipe pressure in the usual well-known manner. Since, as before described, the brake pipe 2 is in communication with the chamber 23 (FIG. 2) in the service portion 10, the pressure of fluid in this chamber gradually reduces with the brake pipe pressure at a controlled service rate. It being remembered that the size of the choke 48 is greater than that of the auxiliary reservoir charging choke 41, upon a predetermined, but light reduction in the pressure in the chamber 23 below that in the chamber 24, the pressure of fluid in the chamber 24 causes the diaphragm 15 to be deflected upward, and through the medium of the stem 17, shifts the graduating valve 25 relative to the service slide valve 27. As the graduating valve 25 is thus shifted, the passageway 56 therein is moved out of alignment with the passageway 57 in the service slide valve 27 so that the graduating valve 25 laps the corresponding port of the passageway 57 opening at the right-hand side of the service slide valve 27, thus closing communication between the valve chamber 24 and the emergency reservoir 3 and also between the chamber 24 and the volume chamber 42. Now when a predetermined light reduction in brake pipe pressure has been effected, a sufficient fluid pressure differential is created on the diaphragm 15 so that this diaphragm will be deflected upward to thereby shift the graduating valve 25 relative to the service slide valve 27 to quick service position, it being understood that this movement of the graduating valve 25 relative to the service slide valve 27 is obtained by means of the usual structure (not shown) provided for this purpose.

In initial quick service position of the graduating valve 25, a cavity 144 in this graduating valve connects the passageways 53 and 60 in the service slide valve 27. At the service slide valve seat 30, the passageway 53, as before described, is connected to the passageway 36, which is at all times open to the brake pipe 2 through chamber 47, the pipe bracket 7 and branch pipe 2a. The passageway 60 is connected to the port and corresponding passageway 35 leading to the quick service volume chamber 45 in the casing section 14, which chamber 45 is constantly open to atmosphere via the choke 46. With the passageways 36 and 35 thus connected to each other, fluid under pressure is permitted to flow from the brake pipe 2 to the quick service volume chamber 45 and from thence is permitted to flow to atmosphere via the choke 46.

The initial local quick service flow of fluid under pressure from the brake pipe 2 to the quick service volume chamber 45 is at a fast rate until the brake pipe pressure substantially equalizes into the volume chamber 45 and then continues at a slower rate governed by the size of the choke 46. The initial flow of fluid to the volume chamber 45 produces a sudden limited quick service reduction in pressure in the brake pipe 2 for initially hastening the operation of the brake control valve device 1 on the next car in a train. The valve device 1 on the next car then operates in a similar manner and in this way a quick serial response to the brake pipe reduction is transmitted from one car to the next throughout the length of the train.

After this sudden limited reduction in brake pipe pressure has been effected by the flow of fluid to the quick service volume chamber 45, the quick service reduction continues at a slower rate via the choke 46. This continued reduction is for the purpose of increasing the differential of pressure acting on the opposite sides of the diaphragm 15 to thereby cause further upward deflection of the diaphragm 15 and shifting of the graduating valve 25 and the service slide valve 27 in the same direction to their service position in which position they are shown in FIG. 4 of the drawings.

As the service slide valve 27 is shifted upward by the diaphragm 15 from its normal release position shown in FIG. 2, the passageway 60 is moved out of alignment with the port and corresponding passageway 35, and the passageway 53 is moved out of alignment with the port and corresponding passageway 36 so that these ports in the service slide valve seat 30 are lapped by the service slide valve 27 thereby closing off further quick service flow of fluid from the brake pipe 2 to atmosphere by way of the quick service volume 45 and choke 46.

Furthermore, as the service slide valve 27 is shifted upward from its release position shown in FIG. 2 to its service position shown in FIG. 4, the passageway 55 in the service slide valve 27 is moved out of alignment with the port and corresponding passageway 32 in the service slide valve seat 30. Also, the left-hand end of the passageway 58 in the service slide valve 27 is moved from the position in which it is in alignment with the port and corresponding passageway 33 in the slide valve seat 30 to a position in which it is in alignment with the port and corresponding passageway 32 which is connected to the brake pipe 2 as hereinbefore explained. Likewise, the left-hand end of the passageway 57 in the slide valve 27 is moved from the position in which it is in alignment with the port and corresponding passageway 34 having therein choke 44 to a position in which it is in alignment with the port and corresponding passageway 33. Moreover, when the service slide valve 27 and the graduating valve 25 are moved from their release position shown in FIG. 2 to their service position shown in FIG. 4, the graduating valve 25 is moved relative to the service slide valve 27 so that the passageway 56 in the graduating valve 25 is moved out of alignment with the passageway 57 in the service slide valve 27.

In view of the above, it is apparent that when the service slide valve 27 and the graduating valve 25 are moved from their release position shown in FIG. 2 to their service position shown in FIG. 4, the port and corresponding passageway 33 is cut off from both the emergency reservoir 4 and the auxiliary reservoir 3, and a communication is established between the port and corresponding passageway 33 and the port and corresponding passageway 32 which is connected to the brake pipe 2 in the manner hereinbefore explained. Since the passageway 33 opens into the volume chamber 42 (FIG. 2) which is connected to the chamber 68 in the accelerated service release valve device 11 via passageway 43, it is evident that both sides of the diaphragm 65 are now subject to the pressure in the brake pipe 2 since the chamber 67 is constantly connected to the brake pipe 2 in the manner hereinbefore explained.

At substantially the same time as the port and corresponding passageway 36 is lapped by the service slide valve 27 in the manner explained above, the port opening from the passageway 61 at the left-hand face of the slide valve 27 is cracked open to the port and corresponding passageway 39 in the slide valve seat 30, it being understood that the port opening from the passageway 61 at the right-hand face of the service slide valve 27 has been previously uncovered by the prior movement of the graduating valve 25 relative to the service slide valve 27. Therefore, fluid under pressure will now start to flow from the chamber 24 and the auxiliary reservoir 3 connected thereto via the pipe and corresponding passageway 28 to the brake cylinder device 5 via the passageway 61 (FIG. 4) in the service slide valve 27, port 39 in valve seat 30 and the corresponding passageway 39 extending through casing section 14 (FIG. 2) and casing 87 (FIG. 3), elongated peripheral annular groove 120 on brake cylinder release valve 116, passageway 118 extending through the casing 87 and casing section 14, the pipe bracket 7 (FIG. 1), the emergency valve portion 9 in the manner explained in hereinbefore-mentioned Patent 3,232,678, and the pipe 119 (FIG. 1).

In the service position of the service slide valve 27 (FIG. 4) a cavity 145 formed in the left-hand face of this slide valve establishes a communication between the port and corresponding passageway 36 and the port and corresponding passageway 37 in the casing section 14. Consequently, when the cavity 145 in the service slide valve 27 is moved into registry with the ports 36 and 37 in the slide valve seat 30, fluid under pressure flows from the brake pipe 2 (FIG. 1) to the brake cylinder device 5 via the conventional quick service limiting valve device 49 (FIG. 2) in the manner explained in the above-mentioned Patent 3,232,678 until the pressure in the brake cylinder device 5 builds up to, for example, ten pounds per square inch whereupon the limiting valve device 49 operates to cut off further flow of fluid under pressure therethrough from the brake pipe 2 to the brake cylinder device 5 and thus terminate the second stage of quick service operation.

It will be understood that the emergency valve portion 9 of the brake control valve device 1 operates in response to a service rate of reduction in the pressure in the brake pipe 2 in the same manner as the emergency valve portion 8 of the brake control valve device 1 shown and described in the above-mentioned Patent 3,232,678.

Service lap

In order to limit the degree of a brake application to that desired, the brake pipe pressure is only reduced an amount sufficient to effect a corresponding degree of brake application. Then, when the auxiliary reservoir pressure in the chamber 24 is reduced, by flow through the ports and corresponding passageway 61 (FIG. 4) in the service slide valve 27 and the port and corresponding passageway 39 in casing section 14 and casing 87 (FIG. 3), groove 120 on brake cylinder release valve 116, passageway 118 extending through casing 87, casing section 14 (FIG. 2), pipe bracket 7 (FIG. 1), and the emergency valve portion 9, and the pipe 119 to the brake cylinder device 5, an amount substantially equal to or slightly below the degree of brake pipe reduction in the chamber 23, the diaphragm 15, valve stem 17 and graduating valve 25 are deflected and moved respectively in a downward direction from their service position shown in FIG. 4 to their service lap position shown in FIG. 5, in which they are brought to a stop by a shoulder 146 on guide member 29 moving into contact with the upper end of the service slide valve 27 which remains in the same position in which it is shown in FIG. 4.

In this service lap position of the graduating valve 25 shown in FIG. 5, the lower end of the cavity 144 in this graduating valve is in alignment with the port at the right-hand end of the passageway 61 in the service slide valve 27, and the upper end of the cavity 144 is closed by the right-hand face of the service slide valve 27. Thus, further flow of fluid under pressure from the auxiliary reservoir 3 to the brake cylinder device 5 is cut off.

Also, in this service lap position of the graduating valve 25, the passageway 56 therein is in alignment with the right-hand end of the passageway 57 in the service slide valve 27. Since the passageway 57 intermediate its ends is connected via the choke 59 and passageway 58 to the port and corresponding passageway 32 which in turn is connected to the brake pipe 2 in the manner hereinbefore described, fluid under pressure can now flow from the brake pipe 2 to the chamber 24 and thence to the auxiliary reservoir 3 via passageway and corresponding pipe 28. Consequently, the pressure in the chamber 24 and the auxiliary reservoir 3 is maintained constant notwithstanding any leakage of fluid under pressure from the auxiliary reservoir 3. By thus maintaining the pressure in the chamber 24 constant while the service slide valve 27 and the graduating valve 25 occupy their service lap position, an undesired release of the brake application in effect is prevented.

It should be noted that, while the graduating valve 25 occupies its service lap position shown in FIG. 5, the chamber 68 (FIG. 2) in the accelerated service release valve device 11 is connected to the brake pipe 2 via the same communication as hereinbefore described for the service position of the service slide valve 27 and graduating valve 25 since the service valve 27 occupies the same position with respect to the service slide valve seat 30 in service lap position as in service position.

Accelerated release of brakes after a service brake application

To effect a release of brakes following a service brake application, the brake pipe 2 is recharged from the usual brake valve device (not shown) on the locomotive. Fluid under pressure thus supplied to the brake pipe 2 flows therefrom via the branch pipe 2a and the passageway and chamber in the pipe bracket 7 to the chamber 47 (FIG. 2), in the casing section 14 and thence to the chamber 23 in the service valve device 10 via choke 48, passageway 36 and branch passageway 36a, and to the chamber 67 on the right-hand side of the diaphragm 65 of the accelerated service release valve device 11 via passageway 36, branch passageway 36a, and branch passageway 36b.

Fluid under pressure supplied to the brake pipe 2 also flows therefrom to the chamber 68 on the left-hand side of the diaphragm 65 via the branch pipe 2a, the passageway and chamber in the pipe bracket 7 (FIG. 1), choke 41 (FIG. 2), pasageway and corresponding port 32 (FIG. 4), passageway 58, choke 59, passageway 57, port and corresponding passageway 33, volume chamber 42 (FIG. 2) and passageway 43. Since this flow to the chamber 68 is through the two chokes 41 and 59 in series, it will be apparent that the rate at which the pressure in the chamber 68 increases is less than the rate at which the pressure in the chamber 67 increases. Consequently, it is apparent that a fluid pressure differential is quickly established on the opposite sides of the diaphragm 65 which is effective to deflect this diaphragm in the direction of the left hand, as viewed in FIG. 2 of the drawings, and thereby shift the valve operating stem 64 in the same direction relative to the wall of the bore 69. This leftward movement of the stem 64 in response to the increasing differential of pressure on the opposite sides of the diaphragm 65, which is obtained prior to the pressure in the brake pipe reaching the same value as the pressure in the auxiliary reservoir 3 and the service slide valve chamber 24, causes the left-hand end of the stem 64 to unseat the valve 63 from its seat 73 against the yielding resistance of the spring 76.

With valve 63 unseated, a fluid pressure communication is established by which fluid under pressure is supplied from the emergency reservoir 4 to the brake pipe 2, this communication extending from the emergency reservoir 4 via the pipe and corresponding passageway 34, branch passageway 34b, chamber 72 and past the unseated valve 63 to bore 71 and thence through chamber 70 and passageway 81 to the inner seated area of the disc valve 84. When the pressure of fluid acting on the upper side of the disc valve 84 and within the inner seated area of this valve increases sufficiently to overcome the biasing force of the spring 86 acting on the lower side thereof, the valve 84 will be unseated from its seat 82. With the valve 84 unseated, a fluid pressure communication is established through which fluid under pressure supplied to the passageway 81 from the emergency reservoir 4, as described above, is conveyed to the chamber 83 and thence to the brake pipe 2 via branch passageways 36c, 36b and 36a, passageway 36, choke 48, chamber 47, the chamber and passageway in the pipe bracket 7 (FIG. 1), and the branch pipe 2a. Thus, upon increasing the pressure in the brake pipe 2 to initiate a release of the brakes subsequent to a service brake application, a slight increase in brake pipe pressure to a value less than that of the retained pressure in the auxiliary reservoir 3 is effective to unseat the valve 63 to establish a communication between the fully charged emergency reservoir 4 and the brake pipe 2 so that fluid under pressure flows from the emergency reservoir 4 to the brake pipe 2 until equalization of pressure therebetween occurs thus hastening a release of the brakes as all of the fluid under pressure supplied to the brake pipe for effecting a release of the brakes does not have to be conveyed from the locomotive back through the brake pipe extending from car to car through the train.

It may be noted that the fluid under pressure supplied from the emergency reservoir 4 (FIG. 1) to the chamber 47 (FIG. 2) when the valve 63 is unseated must flow through the choke 48 in order to flow to the brake pipe 2. It will also be noted that fluid under pressure supplied from the emergency reservoir 4 past the unseated valve 63 may flow at an unrestricted rate to the chamber 23 via the bore 71, chamber 70, passageway 81, past the unseated valve 84, branch passageways 36c, 36b and 36a. Accordingly, it will be apparent that the choke 48 acts to restrict the flow to the chamber 47 and thereby to effect a quick build-up of pressure in the chamber 23 and on the upper side of the diaphragm 15. This increase in pressure on the upper side of the diaphragm 15, due to the restriction provided by the choke 48, aids in quickly establishing a sufficient differential of pressure on the diaphragm 15 to deflect the diaphragm 15 in a downward direction to, through the intermediary of the stem 17, shift the graduating valve 25 and the service slide valve 27 from the service lap position in which they are shown in FIG. 5 downward to their release position in which they are shown in FIG. 2 in which release position fluid under pressure in the brake cylinder device 5 is vented to atmosphere to release the brakes on the corresponding car.

It should be noted that if the pressure in the emergency reservoir 4 and the chamber 95 (FIG. 3), which is connected to the emergency reservoir 4 via the branch passageway 34a and the passageway and corresponding pipe 34, is reduced, by operation of the accelerated service release valve device 11 in the manner just explained, to a value below that of the pressure in the auxiliary reservoir 3 (FIG. 1) and the interior of the counterbore 91 (FIG. 3) which is connected to the auxiliary reservoir via the branch passageway 28a and the passageway and corresponding pipe 28, the higher auxiliary reservoir pressure present in the interior of the counterbore 91 will effect unseating of the valve 96 from the valve seat 92 against the yielding resistance of the spring 97. When the valve 96 is thus unseated, fluid under pressure from both the auxiliary reservoir 3 and the emergency reservoir 4 will flow past the unseated valve 63 in the accelerated service release valve device 11 and thence to the brake pipe 2 in a manner hereinbefore explained until equalization of pressure occurs between the auxiliary reservoir 3, the emergency reservoir 4 and the brake pipe 2.

From the foregoing, it is apparent that if a car provided with the control valve device 1 is hauled in a passenger train the brake pipe pressure of which is, for example 95 pounds per square inch, subsequent to being set off on a side track, is next hauled in a freight train in which the brake pipe pressure may be for example 70 pounds per square inch, the pressure retained in the auxiliary reservoir 3, which pressure may be higher than the freight train brake pipe pressure of, for example 70 pounds per square inch, will flow past the valve 96 (FIG. 3) and thence past the valve 63 (FIG. 2) of accelerated service release valve device 11 to the brake pipe 2 until equalization in the auxiliary reservoir 3, emergency reservoir 4, and the brake pipe 2 occurs. This equalization pressure will be less than that of the fully charged pressure of the brake pipe 2 on the freight train which fully charged pressure, as hereinbefore stated, may be 70 pounds per square inch. Accordingly, a car equipped with the control valve device 1 will operate satisfactorily when hauled in a freight train subsequent to being hauled in a passenger train.

From the above, it should be apparent that the accelerated service release valve device 11 operates, when releasing the brakes after a service brake application, in cooperation with the choke 48 and the service slide valve 27 when in its service lap position to increase the pressure in the chamber 23 to quickly establish a sufficient differential of pressure on the diaphragm 15 to deflect it in a downward direction to shift the graduating valve 25 and service slide valve 27 from their service lap position shown in FIG. 5 to their normal release position shown in FIG. 2, in which release position fluid under pressure is released from the brake cylinder device 5 to atmosphere and the auxiliary reservoir 3 and emergency reservoir are charged in the manner hereinbefore described in connection with initial charging of the equipment from the brake pipe 2 to the pressure normally carried in the brake pipe.

Furthermore, the accelerated service release valve device 11 operates in cooperation with the service valve device 10, the reservoir release valve device 12, the emergency valve portion 9 and the pipe bracket 7 of the brake control valve device 1, when releasing the brakes subsequent to a service application of brakes, to effect the supply of fluid under pressure from the emergency reservoir 4 and also the auxiliary reservoir 3, if the pressure therein is higher than that in the emergency reservoir 4, to the brake pipe 2 until equalization of pressure therebetween is accomplished thereby hastening the propagation of a pressure build-up in the brake pipe 2 and thus a release of the brakes on the train.

When effecting an emergency brake application, the service valve portion 8 of the brake control valve device 1 operates in the same manner as when effecting a service brake application, and the emergency valve portion 9 operates in the same manner as the emergency portion 8 of the brake control valve device 1 of the hereinbefore-mentioned Patent 3,232,678. Therefore, a detailed description of the operation of the brake control valve device 1 constituting the present invention when an emergency brake application is made is not believed to be necessary.

*Manual operation of the brake cylinder release valve device*

A trainman may effect a complete release of a brake application on a car that has been detached from a train by exerting a momentary pull on the manually operated release valve stem 103 (FIG. 3) so as to effect tilting thereof about the periphery of its flange 102 whereupon the center of this flange is effective to move the fluted stem 101 upward only far enough for this stem to unseat the valve 98 from its seat 90 without effecting unseating of the valve 96 from its seat 92.

Since the interior of the counterbore 91 is connected to the auxiliary reservoir 3 via the branch passageway 28a, and the passageway and corresponding pipe 28, fluid under pressure from the auxiliary reservoir 3 will flow past the unseated valve 98 to the interior of the bore 89. From FIG. 3 of the drawings, it is apparent that the fluted stem 101 slidably disposed in the bore 89 restricts the flow of fluid under pressure therefrom to atmosphere so that some of the fluid under pressure supplied past the unseated valve 98 will flow from the interior of the bore 89 to the chamber 129 below the diaphragm 126 of the brake cylinder release valve device 13 via the passageways 141 and 134, the choke 135 and the elongated peripheral annular groove 121 on the brake cylinder release valve 116. Fluid under pressure thus supplied to the chamber 129 causes the diaphragm 126 to move the brake cylinder release valve 116 upward to the position in which the elongated peripheral annular groove 120 on the valve 116 establishes a communication between the passageway 39 and the passageway 142. In this position of the release valve 116, the passageway 118 is open to atmosphere via passageway 117, bores 110 and 109, chamber 108, and past shield 112 which is deflected away from surface 114 as fluid under pressure flows from the brake cylinder device 5 to atmosphere. When the passageway 118 is thus opened to atmosphere, fluid under pressure will be completely vented from the brake cylinder device 5 via the pathway hereinbefore described thus effecting a release of the brakes on the car provided with the brake control valve device 1.

When the elongated annular groove 120 establishes a communication between the passageway 39 and the passageway 142, fluid under pressure present in the passageway 39 flows to the chamber 129 via the groove 120 and passageway 142. The fluid under pressure thus supplied to the chamber 129 is effective to further deflect the diaphragm 126 in an upward direction against the yielding resistance of the spring 132 to move the brake cylinder release valve 116 upward until the upper end thereof contacts the cover member 127. In this position of the release valve 116, the upper O-ring 122 thereon is disposed above the location at which the choke 135 opens at the wall surface of the bore 110 and forms a seal with this wall surface. Consequently, fluid under pressure in the chamber 129 cannot be vented therefrom to atmosphere via choke 135, passageways 134 and 141, bore 89 and bore 104. Accordingly, the brake cylinder release valve 116 will remain in its upper position until fluid under pressure is vented from the chamber 129 either as the result of leakage of fluid under pressure from the auxiliary reservoir 3 while a car is setting on a side track subsequent to effecting an emergency brake application, or in response to the return of the service slide valve 27 and the graduating valve 25 to their release position upon effecting a release of the brake application by recharging the brake pipe subsequent to coupling the car to a train.

It will be noted that when an emergency brake application is effected, the service slide valve 27 and the graduating valve 25 will move to their service position and remain in their service position until the brake pipe is again recharged. Therefore, while a car is sitting on a side track subsequent to effecting an emergency brake application, a manual release of the brakes is effected whereby the release valve device 116 is moved to its upper position, the auxiliary reservoir 3 is connected to the chamber 129 below the diaphragm 126 via the pipe and corresponding passageway 28, service slide valve chamber 24, passageway 61 in the service slide valve 27, passageway 39, the elongated peripheral annular groove 120 in brake cylinder release valve 116 now in its upper position and passageway 142. Accordingly, it will be apparent that leakage of fluid under pressure from the auxiliary reservoir 3, occurring while a car is sitting on a side track will correspondingly reduce the pressure in the chamber 129, and when the pressure in this chamber is reduced sufficiently as a result of leakage, the spring 132 will return the diaphragm 126 and the brake cylinder release valve 116 to the position shown in FIG. 3.

It will also be noted that when the car is again coupled into the train and the brake pipe pressure is thereafter increased to its normal full charged value to cause the release of a brake application, the service slide valve 27 and the graduating valve 25 are returned to their release position shown in FIG. 2 of the drawings. Accordingly, when the service slide valve 27 is thus returned to its release position while the brake cylinder release valve 116 occupies its upper position, the fluid under pressure in chamber 129 (FIG. 3) below diaphragm 126, if it has not already been lost by leakage as explained above, is released to atmosphere via passageway 142, peripheral annular groove 120 on the brake cylinder release valve 116, passageway 39, cavity 143 (FIG. 2), passageway 38, choke 52, the passageway and chamber in the pipe bracket 7 (FIG. 1), pipe 50 and the retaining valve device 6 which it may be assumed is in a non-retaining position. Therefore, as fluid under pressure is thus vented from the chamber 129 (FIG. 3) the spring 132 is rendered effective to return the diaphragm 126 and the brake cylinder release valve 116 from their upper position to their lower position in which they are shown in FIG. 3.

*Manual operation of the reservoir release valve*

Fluid under pressure may be partly or completely released from the auxiliary reservoir 3 at any time by a trainman exerting a pull on manually operated released valve stem 103 (FIG. 3) to tilt the flange 102 only far enough to cause the fluted stem 101 to move up a sufficient distance for the upper end thereof to move the valve 98 against the yielding resistance of the spring 100 upward away from the valve seat 90 without unseating valve 96 from its seat 92 so that fluid at auxiliary reservoir pressure present in the interior of the conterbore 91 can flow past the valve seat 90 and thence to atmosphere via the bore 89, the flutes on the stem 101, and the bore 104 until the pressure in the auxiliary reservoir 3 is reduced to any desired value, or completely vented to atmosphere if so desired by the trainman.

If the trainman desires to partly or completely release fluid under pressure from both the auxiliary reservoir 3 and the emergency reservoir 4, he will exert a pull on the manually operated release valve stem 103 to tilt the flange 102 far enough to cause the fluted stem 101 to move up a sufficient distance for the upper end thereof to first move the valve 98 against the yielding resistance of the spring 100 upward away from the valve seat 90 until the upper end of the stem 99 is moved into contact with the lower side of the valve 96. As the trainman continues to exert a pull on the manually operated release valve stem 103, the flange 102 will be tilted further thereby causing additional upward movement of the fluted stem 101, valve 98 and stem 99 which is effective to now move the valve 96 against the yielding resistance of the spring 97 upward away from its seat 92. Upon thus unseating the valve 96, fluid at emergency reservoir pressure in the chamber 95 will flow past the valve seat 92 to the interior of the counterbore 91, thence past the unseated valve 98 and to atmosphere along with fluid under pressure from the auxiliary reservoir 3 which is simultaneously vented to atmosphere in the manner described above. Thus the pressure in both the emergency reservoir 4 and the auxiliary reservoir 3 are simultaneously reduced to any desired degree, or completely vented to atmosphere.

It should be noted that when the valve 98 is unseated in the manner described above, fluid under pressure will flow from the auxiliary reservoir 3 to the chamber 129 in the brake cylinder release valve device 13 via a pathway hereinbefore described to cause this valve device 13 to be operated to effect a release of fluid under pressure from the brake cylinder device 5 to atmosphere if this brake cylinder release valve device 13 has not been previously operated to effect a release of the brakes on the car.

Having now described the invention, what I claim as new and desire to secure by Letters Patent is:

1. In a fluid pressure brake system including a normally charged brake pipe, an auxiliary reservoir, an emergency reservoir, a brake cylinder device and a fluid pressure brake control valve device having a service valve device, the improvement comprising the combination of:
   (a) an accelerated service release valve mechanism having:
      (i) a normally closed valve for controlling flow of fluid under pressure from the emergency reservoir to the brake pipe, and
      (ii) a movable abutment operable to effect opening of said valve and subject to opposing pressures in two chambers on opposite sides thereof, respectively, one of said chambers being constantly connected without restriction to the brake pipe, (b) a service valve device comprising:
  (i) valve means effective in a service application position of the service valve device to establish a communication between the brake pipe and the other of said two chambers, and
(c) choke means disposed in said communication for restricting the rate of charging of said other chamber with respect to the rate at which the said one chamber is charged from the brake pipe,
(d) said abutment of said accelerated service release valve mechanism being operative upon the supply of fluid under pressure to the brake pipe, responsively to the establishment of a differential fluid pressure force thereon, to effect opening of said normally closed valve to cause flow of fluid under pressure from the emergency reservoir to the brake pipe whereby a prompt and instantaneous increase in the pressure in the brake pipe effects operation of said service valve device to its release position to effect a brake release.

2. A fluid pressure brake system, as claimed in claim 1, further characterized by a volume reservoir constantly connected to the other of said chambers.

3. A fluid pressure brake system, as claimed in claim 1, characterized by:
  (a) means providing a fluid flow communication between said auxiliary and emergency reservoirs, and
  (b) check valve means disposed in said communication operative to unseat to cause flow of fluid under pressure from the auxiliary reservoir to the emergency reservoir whenever the emergency reservoir pressure reduces below the auxiliary reservoir pressure.

4. A fluid pressure brake system, as claimed in claim 1, characterized by a reservoir release valve device operable to selectively release fluid under pressure from one or both of the auxiliary and emergency reservoirs, said reservoir release valve device comprising check valve means effective to provide for flow of fluid under pressure from the auxiliary to the emergency reservoir whenever the emergency reservoir pressure reduces below the pressure in the auxiliary reservoir.

5. A fluid pressure brake system, as claimed in claim 1, characterized by a reservoir release valve device comprising:
  (a) a first check valve effective when unseated to release fluid under pressure from said auxiliary reservoir,
  (b) a second check valve effective when unseated concurrently with said first check valve for releasing fluid under pressure from said emergency reservoir, and
  (c) means for unseating said first check valve alone at one time and for unseating both check valves at another time,
  (d) said second check valve being subject opposingly to pressures in the auxiliary reservoir and in the emergency reservoir and unseated responsively to a reduction of pressure in the emergency reservoir below that in the auxiliary reservoir to cause flow of fluid under pressure from the auxiliary reservoir to the emergency reservoir without operation of said first check valve.

6. In a fluid pressure brake control system of the type having an auxiliary reservoir and an emergency reservoir each of which reservoirs is charged with fluid under pressure, a reservoir release valve device for releasing fluid under pressure from said reservoirs comprising, in combination:
  (a) a first check valve effective when unseated to release fluid under pressure from said auxiliary reservoir,
  (b) a second check valve effective when unseated concurrently with said first check valve for releasing fluid under pressure from said emergency reservoir, and
  (c) means for unseating said first check valve alone at one time and for unseating both said check valves at another time,
  (d) said second check valve being subject opposingly to pressures in the auxiliary reservoir and in the emergency reservoir and unseated responsively to a reduction of pressure in the emergency reservoir below that in the auxiliary reservoir to cause flow of fluid under pressure from the auxiliary reservoir to the emergency reservoir without operation of said first check valve.

7. A fluid pressure brake system, as claimed in claim 1, further characterized in that:
  (a) said service valve device comprises:
    (i) a movable abutment subject on one side to the pressure in the brake pipe and on the opposite side to the pressure in the auxiliary reservoir, and
    (ii) a slide valve operably connected to said abutment and having a restricted passageway therein through which, in one position of said slide valve, a communication is established between the brake pipe and the other of said two chambers of said accelerated service release valve mechanism whereby, upon an increase in pressure in said brake pipe, a differential pressure force is established on the opposite sides of said movable abutment of said accelerated service release valve mechanism to cause unseating of said normally closed valve,
    (iii) said slide valve being operated by the said abutment connected thereto, in response to the fluid under pressure supplied to the brake pipe upon the unseating of said valve to a second position in which said communication between the brake pipe and the other of said two chambers is cut off.

8. A fluid pressure brake system, as claimed in claim 1, further characterized in that:
  (a) said service valve device comprises:
    (i) a movable abutment subject on one side to the pressure in the brake pipe and on the opposite side to the pressure in the auxiliary reservoir,
    (ii) a slide valve operably connected to said abutment and having a passageway therein through which, in one position of said slide valve, a communication is established between the brake pipe and the other of said two chambers of said accelerated service release valve mechanism, and
    (iii) choke means disposed in said passageway in said slide valve for providing a restricted rate of flow of fluid under pressure through said passageway whereby, upon an increase in pressure in the brake pipe, a differential pressure force is established on the opposite sides of said movable abutment of said accelerated service release valve mechanism to cause unseating of said normally closed valve,
    (iv) said slide valve being operated by said abutment connected thereto, in response to the fluid under pressure supplied to the brake pipe upon the unseating of said normally closed valve, from said one position to another position in which said communication between the brake pipe and the other of said two chambers is cut off.

9. In a fluid pressure brake system of the type including a normally charged brake pipe, an auxiliary reservoir, an emergency reservoir, a brake cylinder device, and a fluid pressure brake control valve device having a service valve device, the improvement comprising the combination of:

(a) an accelerated service release valve mechanism having:
    (i) a normally closed valve for controlling flow of fluid under pressure from the emergency reservoir to the brake pipe, and
    (ii) a movable abutment operable to effect opening of said valve and subject to opposing pressures in two chambers, on opposite sides thereof respectively, one of said chambers being constantly connected without restriction to the brake pipe,
(b) a volume reservoir constantly connected to the other of said two chambers,
(c) a service slide valve device comprising:
    (i) a slide valve effective in a service application position to establish a communication between the brake pipe and the other of said two chambers, and
    (ii) a graduating valve slidably mounted on and movable relative to said slide valve, said graduating valve and said slide valve cooperating in a service lap position to provide for flow of fluid under pressure from the brake pipe to the auxiliary reservoir and to said volume reservoir whereby the pressure in both the auxiliary reservoir and said volume reservoir is maintained constant notwithstanding limited leakage of fluid under pressure from these reservoirs, and
(d) choke means disposed in said communication for restricting the rate of charging of the other of said chambers with respect to the rate at which the said one chamber is charged from the brake pipe,
(e) said abutment of said accelerated service release valve mechanism being operative upon the supply of fluid under pressure to the brake pipe responsively to the establishment of a differential fluid pressure force thereon to effect opening of said normally closed valve to cause flow of fluid under pressure from the emergency reservoir to the brake pipe whereby a prompt and instantaneous increase in the pressure in the brake pipe effects operation of said slide valve of said service slide valve device to its release position to effect a brake release.

10. A fluid pressure brake system, as claimed in claim 8, further cahracterized in that said choke means disposed in said passageway in said service slide valve in one position of said slide valve provides a restricted communication between said volume reservoir and the auxiliary reservoir, and in another position of said slide valve provides a restricted communication between said volume reservoir and the brake pipe.

References Cited

UNITED STATES PATENTS

| | | | |
|---|---|---|---|
| 2,913,282 | 11/1959 | Jeffrey | 303—35 |
| 2,994,565 | 8/1961 | McClure et al. | 303—35 X |
| 3,232,678 | 2/1966 | Wilson | 303—80 |

DUANE A. REGER, *Primary Examiner.*